(12) United States Patent
Hebein et al.

(10) Patent No.: US 12,200,613 B2
(45) Date of Patent: Jan. 14, 2025

(54) RADIO ACCESS TECHNOLOGY SEARCHING IN DUAL ACTIVE MODE

(71) Applicant: QUALCOMM Incorporated, San Diego, CA (US)

(72) Inventors: Adam Hebein, San Diego, CA (US); Qin Xue Frantti, San Diego, CA (US); Brian A'Hearn, San Diego, CA (US); Rishav Rej, San Diego, CA (US); Qingxin Chen, San Diego, CA (US); Uttam Pattanayak, San Diego, CA (US); Vikram Singh, San Diego, CA (US); Bhupesh Manoharlal Umatt, Poway, CA (US); Carlos Marcelo Dias Pazos, Carlsbad, CA (US); Osama Lotfallah, San Diego, CA (US); Flora Pui San Chan, San Diego, CA (US); Manisha Priyadarshini, San Diego, CA (US); Abhishek Bhatnagar, San Diego, CA (US); Reza Shahidi, San Diego, CA (US); Cheol Hee Park, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 421 days.

(21) Appl. No.: 17/650,435

(22) Filed: Feb. 9, 2022

(65) Prior Publication Data

US 2023/0011024 A1     Jan. 12, 2023

Related U.S. Application Data

(60) Provisional application No. 63/219,674, filed on Jul. 8, 2021.

(51) Int. Cl.
*H04W 48/16* (2009.01)
*H04W 8/18* (2009.01)
(Continued)

(52) U.S. Cl.
CPC ............. *H04W 48/16* (2013.01); *H04W 8/18* (2013.01); *H04W 52/0241* (2013.01); *H04W 88/06* (2013.01)

(58) Field of Classification Search
CPC ................... H04W 48/16; H04W 8/18; H04W 52/0241; H04W 88/06; H04W 8/183; H04W 48/18
See application file for complete search history.

(56) References Cited

U.S. PATENT DOCUMENTS

2012/0264425 A1   10/2012  Krishnamoorthy et al.
2013/0121483 A1*   5/2013  Murakami .............. H04M 3/54
                                                  379/212.01
(Continued)

FOREIGN PATENT DOCUMENTS

WO    WO-2015180779 A1   12/2015
WO    WO-2018053746 A1    3/2018

OTHER PUBLICATIONS

International Search Report and Written Opinion—PCT/US2022/072368—ISA/EPO—Sep. 14, 2022.
(Continued)

*Primary Examiner* — Kabir A Timory
(74) *Attorney, Agent, or Firm* — QUALCOMM Incorporated

(57) ABSTRACT

Various aspects of the present disclosure generally relate to wireless communication. In some aspects, a user equipment (UE) may detect that a first subscription, of a plurality of subscriptions associated with the UE, is associated with an active service on a first cellular network. The UE may search, for a second subscription of the plurality of subscriptions, for radio access technologies (RATs) and frequency bands that are compatible with a dual active mode of the UE. In some aspects, the UE may detect that the active service on the first cellular network has ended. Accordingly, the UE may search, for the second subscription, for RATs
(Continued)

and frequency bands that are compatible with the dual active mode of the UE and for RATs and frequency bands that are incompatible with the dual active mode, before expiry of a timer associated with a power saving state. Numerous other aspects are described.

26 Claims, 8 Drawing Sheets

(51) Int. Cl.
*H04W 52/02* (2009.01)
*H04W 88/06* (2009.01)

(56) References Cited

U.S. PATENT DOCUMENTS

| | | |
|---|---|---|
| 2015/0296364 A1 | 10/2015 | Peruru et al. |
| 2017/0353915 A1* | 12/2017 | Da Silva ............... H04W 48/18 |
| 2020/0236655 A1 | 7/2020 | Bharadwaj et al. |
| 2021/0067303 A1 | 3/2021 | Taherzadeh Boroujeni et al. |
| 2021/0266885 A1 | 8/2021 | Sarkis et al. |

OTHER PUBLICATIONS

International Search Report and Written Opinion—PCT/US2022/074520—ISA/EPO—Oct. 24, 2022.

LG Electronics: "Discussion on Inter-UE Coordination for Mode 2 Enhancements", 3GPP TSG RAN WG1 Meeting #106e, R1-2107529, 3rd Generation Partnership Project, Mobile Competence Centre, 650, Route Des Lucioles, F-06921 Sophia-Antipolis Cedex, France, vol. RAN WG1, No. e-Meeting, Aug. 16, 20210-Aug. 27, 2021, Aug. 7, 2021, 31 Pages, XP052038442, paragraph [0001]-paragraph [0002], Section 2.4.

Qualcomm Incorporated: "Reliability and Latency Enhancements for Mode 2", R1-2108627, 3GPP TSG RAN WG1 Meeting #106-e, 3rd Generation Partnership Project (3GPP), Mobile Competence Centre, 650, Route Des Lucioles, F-06921 Sophia-Antipolis Cedex, France, Aug. 16-27, 2021, 39 Pages, Aug. 27, 2021, XP052042854, The whole document.

* cited by examiner

RADIO ACCESS TECHNOLOGY SEARCHING IN DUAL ACTIVE MODE

CROSS-REFERENCE TO RELATED APPLICATION

This Patent application claims priority to U.S. Provisional Patent Application No. 63/219,674, filed on Jul. 8, 2021, entitled "RADIO ACCESS TECHNOLOGY SEARCHING IN DUAL ACTIVE MODE," and assigned to the assignee hereof. The disclosure of the prior application is considered part of and is incorporated by reference in this Patent application.

FIELD OF THE DISCLOSURE

Aspects of the present disclosure generally relate to wireless communication and to techniques and apparatuses for performing radio access technology searching in a dual active mode.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include one or more base stations that support communication for a user equipment (UE) or multiple UEs. A UE may communicate with a base station via downlink communications and uplink communications. "Downlink" (or "DL") refers to a communication link from the base station to the UE, and "uplink" (or "UL") refers to a communication link from the UE to the base station.

The above multiple access technologies have been adopted in various telecommunication standards to provide a common protocol that enables different UEs to communicate on a municipal, national, regional, and/or global level. New Radio (NR), which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM and/or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

Some aspects described herein relate to an apparatus for wireless communication at a user equipment (UE). The apparatus may include a memory and one or more processors, coupled with the memory, configured to detect that a first subscription, of a plurality of subscriptions associated with the UE, is associated with an active service on a first cellular network, and search, for a second subscription of the plurality of subscriptions, for radio access technologies (RATs) and frequency bands that are compatible with a dual active mode of the UE.

Some aspects described herein relate to a method of wireless communication performed by a UE. The method may include detecting that a first subscription, of a plurality of subscriptions associated with the UE, is associated with an active service on a first cellular network. The method may further include searching, for a second subscription of the plurality of subscriptions, for RATs and frequency bands that are compatible with a dual active mode of the UE.

Some aspects described herein relate to a non-transitory computer-readable medium that stores a set of instructions for wireless communication by a UE. The set of instructions, when executed by one or more processors of the UE, may cause the UE to detect that a first subscription, of a plurality of subscriptions associated with the UE, is associated with an active service on a first cellular network. The set of instructions, when executed by one or more processors of the UE, may further cause the UE to search, for a second subscription of the plurality of subscriptions, for RATs and frequency bands that are compatible with a dual active mode of the UE.

Some aspects described herein relate to an apparatus for wireless communication. The apparatus may include means for detecting that a first subscription, of a plurality of subscriptions associated with the apparatus, is associated with an active service on a first cellular network. The apparatus may further include means for searching, for a second subscription of the plurality of subscriptions, for RATs and frequency bands that are compatible with a dual active mode of the apparatus.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages, will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). It is intended that aspects described herein may be practiced in a wide variety of devices, components, systems, distributed arrangements, and/or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

Figure 1:
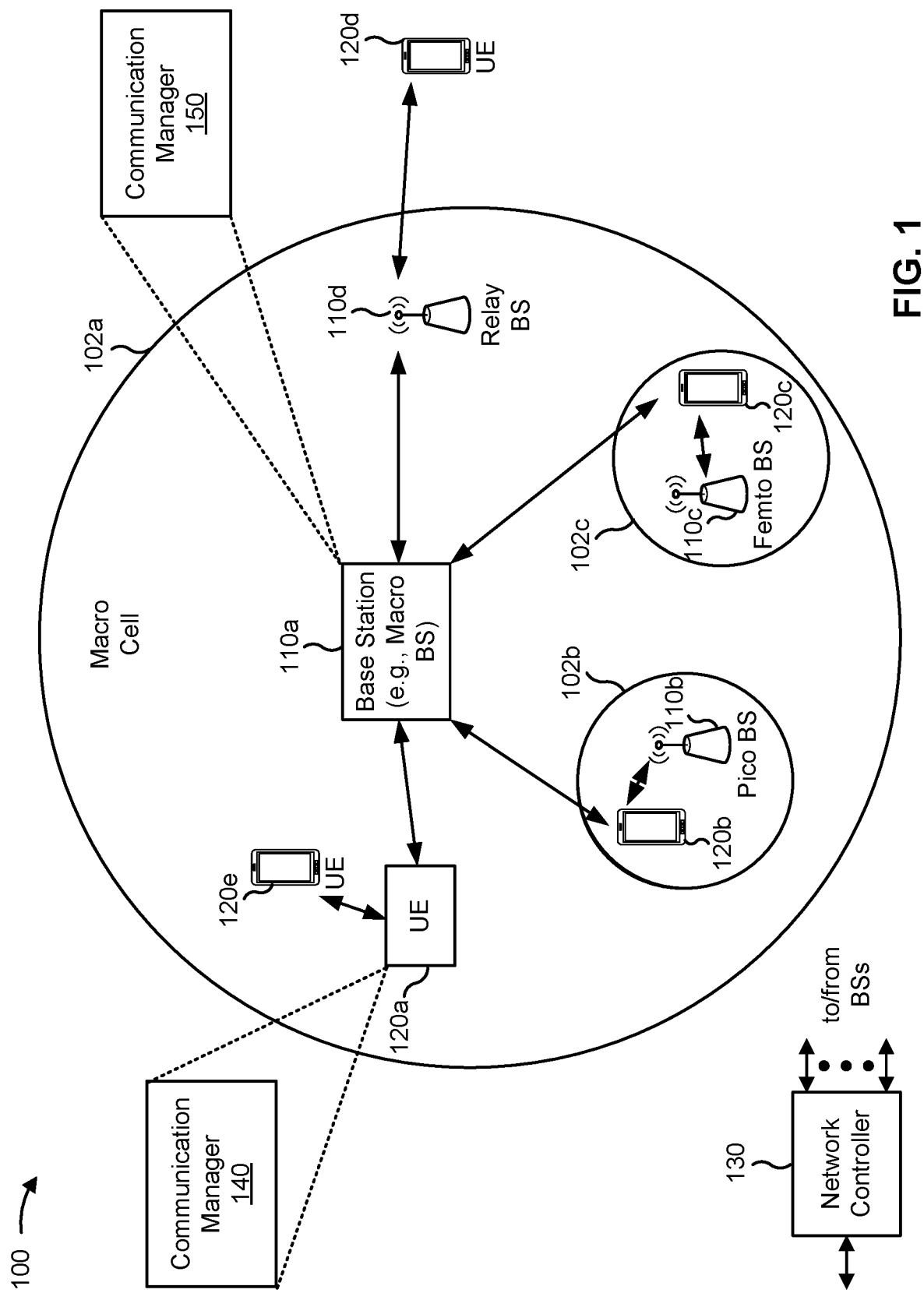
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (e.g., NR) network and/or a 4G (e.g., Long Term Evolution (LTE)) network, among other examples. The wireless network 100 may include one or more base stations 110 (shown as a BS 110a, a BS 110b, a BS 110c, and a BS 110d), a user equipment (UE) 120 or multiple UEs 120 (shown as a UE 120a, a UE 120b, a UE 120c, a UE 120d, and a UE 120e), and/or other network entities. A base station 110 is an entity that communicates with UEs 120. A base station 110 (sometimes referred to as a BS) may include, for example, an NR base station, an LTE base station, a Node B, an eNB (e.g., in 4G), a gNB (e.g., in 5G), an access point, and/or a transmission reception point (TRP). Each base station 110 may provide communication coverage for a particular geographic area. In the Third Generation Partnership Project (3GPP), the term "cell" can refer to a coverage area of a base station 110 and/or a base station subsystem serving this coverage area, depending on the context in which the term is used.

A base station 110 may provide communication coverage for a macro cell, a pico cell, a femto cell, and/or another type of cell. A macro cell may cover a relatively large geographic area (e.g., several kilometers in radius) and may allow unrestricted access by UEs 120 with service subscriptions. A pico cell may cover a relatively small geographic area and may allow unrestricted access by UEs 120 with service subscription. A femto cell may cover a relatively small geographic area (e.g., a home) and may allow restricted access by UEs 120 having association with the femto cell (e.g., UEs 120 in a closed subscriber group (CSG)). A base station 110 for a macro cell may be referred to as a macro base station. A base station 110 for a pico cell may be referred to as a pico base station. A base station 110 for a femto cell may be referred to as a femto base station or an in-home base station. In the example shown in FIG. 1, the BS 110a may be a macro base station for a macro cell 102a, the BS 110b may be a pico base station for a pico cell 102b, and the BS 110c may be a femto base station for a femto cell 102c. A base station may support one or multiple (e.g., three) cells.

In some aspects, the term "base station" (e.g., the base station 110) or "network entity" may refer to an aggregated base station, a disaggregated base station, an integrated access and backhaul (IAB) node, a relay node, and/or one or more components thereof. For example, in some aspects, "base station" or "network entity" may refer to a central unit (CU), a distributed unit (DU), a radio unit (RU), a Near-Real Time (Near-RT) RAN Intelligent Controller (RIC), or a Non-Real Time (Non-RT) RIC, or a combination thereof. In some aspects, the term "base station" or "network entity" may refer to one device configured to perform one or more functions, such as those described herein in connection with the base station 110. In some aspects, the term "base station" or "network entity" may refer to a plurality of devices configured to perform the one or more functions. For example, in some distributed systems, each of a number of different devices (which may be located in the same geographic location or in different geographic locations) may be configured to perform at least a portion of a function, or to duplicate performance of at least a portion of the function, and the term "base station" or "network entity" may refer to any one or more of those different devices. In some aspects, the term "base station" or "network entity" may refer to one or more virtual base stations and/or one or more virtual base station functions. For example, in some aspects, two or more base station functions may be instantiated on a single device. In some aspects, the term "base station" or "network entity" may refer to one of the base station functions and not another. In this way, a single device may include more than one base station.

In some examples, a cell may not necessarily be stationary, and the geographic area of the cell may move according to the location of a base station 110 that is mobile (e.g., a mobile base station). In some examples, the base stations 110 may be interconnected to one another and/or to one or more other base stations 110 or network nodes (not shown) in the wireless network 100 through various types of backhaul interfaces, such as a direct physical connection or a virtual network, using any suitable transport network.

The wireless network 100 may include one or more relay stations. A relay station is an entity that can receive a transmission of data from an upstream station (e.g., a base station 110 or a UE 120) and send a transmission of the data to a downstream station (e.g., a UE 120 or a base station 110). A relay station may be a UE 120 that can relay transmissions for other UEs 120. In the example shown in FIG. 1, the BS 110d (e.g., a relay base station) may communicate with the BS 110a (e.g., a macro base station) and the UE 120d in order to facilitate communication between the BS 110a and the UE 120d. A base station 110 that relays communications may be referred to as a relay station, a relay base station, a relay, or the like.

The wireless network 100 may be a heterogeneous network that includes base stations 110 of different types, such as macro base stations, pico base stations, femto base stations, relay base stations, or the like. These different types of base stations 110 may have different transmit power levels, different coverage areas, and/or different impacts on interference in the wireless network 100. For example, macro base stations may have a high transmit power level (e.g., 5 to 40 watts) whereas pico base stations, femto base stations, and relay base stations may have lower transmit power levels (e.g., 0.1 to 2 watts).

A network controller 130 may couple to or communicate with a set of base stations 110 and may provide coordination and control for these base stations 110. The network controller 130 may communicate with the base stations 110 via a backhaul communication link. The base stations 110 may communicate with one another directly or indirectly via a wireless or wireline backhaul communication link.

The UEs 120 may be dispersed throughout the wireless network 100, and each UE 120 may be stationary or mobile. A UE 120 may include, for example, an access terminal, a terminal, a mobile station, and/or a subscriber unit. A UE 120 may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (e.g., a smart watch, smart clothing, smart glasses, a smart wristband, smart jewelry (e.g., a smart ring or a smart bracelet)), an entertainment device (e.g., a music device, a video device, and/or a satellite radio), a vehicular component or sensor, a smart meter/sensor, industrial manufacturing equipment, a global positioning system device, and/or any other suitable device that is configured to communicate via a wireless medium.

Some UEs 120 may be considered machine-type communication (MTC) or evolved or enhanced machine-type communication (eMTC) UEs. An MTC UE and/or an eMTC UE may include, for example, a robot, a drone, a remote device, a sensor, a meter, a monitor, and/or a location tag, that may communicate with a base station, another device (e.g., a remote device), or some other entity. Some UEs 120 may be considered Internet-of-Things (IoT) devices, and/or may be implemented as NB-IoT (narrowband IoT) devices. Some UEs 120 may be considered a Customer Premises Equipment. A UE 120 may be included inside a housing that houses components of the UE 120, such as processor components and/or memory components. In some examples, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks 100 may be deployed in a given geographic area. Each wireless network 100 may support a particular RAT and may operate on one or more frequencies. A RAT may be referred to as a radio technology, an air interface, or the like. A frequency may be referred to as a carrier, a frequency channel, or the like. Each frequency may support a single RAT in a given geographic area in order to avoid interference between wireless networks of different RATs. In some cases, NR or 5G RAT networks may be deployed.

In some examples, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, or a vehicle-to-pedestrian (V2P) protocol), and/or a mesh network. In such examples, a UE 120 may perform scheduling operations, resource selection operations, and/or other operations described elsewhere herein as being performed by the base station 110.

In some cases, a UE 120 may be a multi-subscriber identity module (SIM) UE. For example, the UE 120 may communicate with a first base station 110*a* using a first SIM. The UE 120 may communicate with a second base station 110*b* using a second SIM. Each SIM may be associated with a subscription. A subscription may be a subscription with a network operator (for example, a mobile network operator (MNO)) that enables the UE 120 to access a wireless network (for example, a radio access network (RAN)) associated with the network operator.

Devices of the wireless network 100 may communicate using the electromagnetic spectrum, which may be subdivided by frequency or wavelength into various classes, bands, channels, or the like. For example, devices of the wireless network 100 may communicate using one or more operating bands. In 5G NR, two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above examples in mind, unless specifically stated otherwise, it should be understood that the term "sub-6 GHz" or the like, if used herein, may broadly represent frequencies that may be less than 6 GHz, may be within FR1, or may include mid-band frequencies. Further, unless specifically stated otherwise, it should be understood that the term "millimeter wave" or the like, if used herein, may broadly represent frequencies that may include mid-band frequencies, may be within FR2, FR4, FR4-a or FR4-1, and/or FR5, or may be within the EHF band. It is contemplated that the frequencies included in these operating bands (e.g., FR1, FR2, FR3, FR4, FR4-a, FR4-1, and/or FR5) may be modified, and techniques described herein are applicable to those modified frequency ranges.

In some aspects, the UE 120 may include a communication manager 140. As described in more detail elsewhere herein, the communication manager 140 may detect that a first subscription, of a plurality of subscriptions associated with the UE 120, is associated with an active service on a first cellular network, and search, for a second subscription of the plurality of subscriptions, for RATs and frequency bands that are compatible with a dual active mode of the UE 120. Additionally, or alternatively, the communication manager 140 may perform one or more other operations described herein.

In some aspects, the base station 110 may include a communication manager 150. The communication manager 150 may perform one or more operations described herein.

As indicated above, FIG. 1 is provided as an example. Other examples may differ from what is described with regard to FIG. 1.

Figure 2:
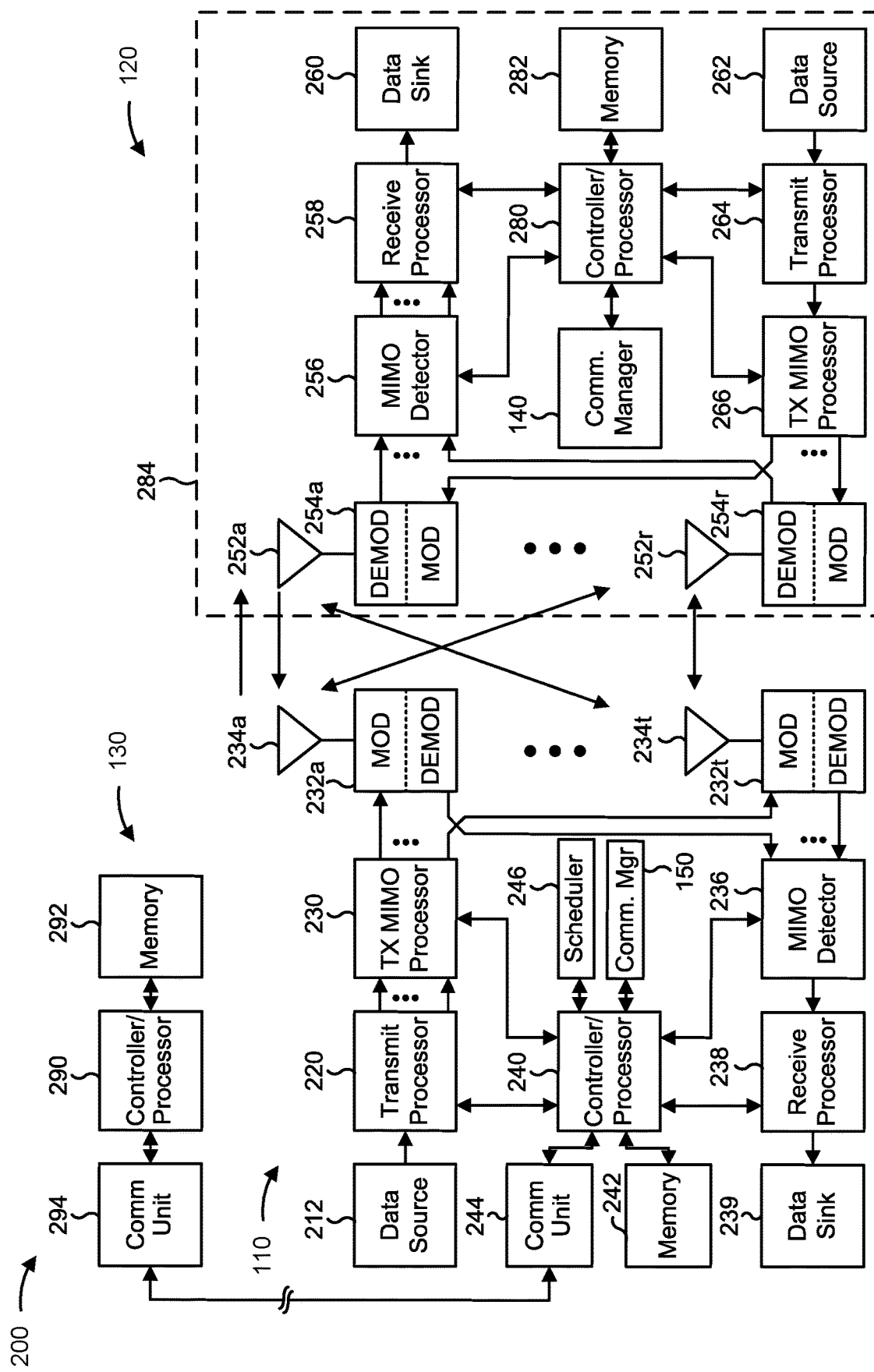
FIG. 2 is a diagram illustrating an example of a base station in communication with a user equipment (UE) in a wireless network, in accordance with the present disclosure.

FIG. 2 is a diagram illustrating an example 200 of a base station 110 in communication with a UE 120 in a wireless network 100, in accordance with the present disclosure. The base station 110 may be equipped with a set of antennas 234*a* through 234*t*, such as T antennas (T≥1). The UE 120 may be equipped with a set of antennas 252*a* through 252*r*, such as R antennas (R≥1).

At the base station 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The base station 110 may process (e.g., encode and modulate) the data for the UE 120 based at least in part on the MCS(s) selected for the UE 120 and may provide data symbols for the UE 120. The transmit processor 220 may process system information (e.g., for semi-static resource partitioning information (SRPI)) and control information (e.g., CQI requests, grants, and/or upper layer signaling) and provide overhead symbols and control symbols. The transmit processor 220 may generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide a set of output symbol streams (e.g., T output symbol streams) to a corresponding set of modems 232 (e.g., T modems), shown as modems 232*a* through 232*t*. For example, each output symbol stream may be provided to a modulator component (shown as MOD) of a modem 232. Each modem 232 may use a respective modulator component to process a respective output symbol stream (e.g., for OFDM) to obtain an output sample stream. Each modem 232 may further use a respective modulator component to process (e.g., convert to analog, amplify, filter, and/or upconvert) the output sample stream to obtain a downlink signal. The modems 232*a* through 232*t* may transmit a set of downlink signals (e.g., T downlink signals) via a corresponding set of antennas 234 (e.g., T antennas), shown as antennas 234*a* through 234*t*.

At the UE 120, a set of antennas 252 (shown as antennas 252*a* through 252*r*) may receive the downlink signals from the base station 110 and/or other base stations 110 and may provide a set of received signals (e.g., R received signals) to a set of modems 254 (e.g., R modems), shown as modems 254*a* through 254*r*. For example, each received signal may be provided to a demodulator component (shown as DEMOD) of a modem 254. Each modem 254 may use a respective demodulator component to condition (e.g., filter, amplify, downconvert, and/or digitize) a received signal to obtain input samples. Each modem 254 may use a demodulator component to further process the input samples (e.g., for OFDM) to obtain received symbols. A MIMO detector 256 may obtain received symbols from the modems 254, may perform MIMO detection on the received symbols if applicable, and may provide detected symbols. A receive processor 258 may process (e.g., demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the base station 110 via the communication unit 294.

One or more antennas (e.g., antennas 234a through 234t and/or antennas 252a through 252r) may include, or may be included within, one or more antenna panels, one or more antenna groups, one or more sets of antenna elements, and/or one or more antenna arrays, among other examples. An antenna panel, an antenna group, a set of antenna elements, and/or an antenna array may include one or more antenna elements (within a single housing or multiple housings), a set of coplanar antenna elements, a set of non-coplanar antenna elements, and/or one or more antenna elements coupled to one or more transmission and/or reception components, such as one or more components of FIG. 2.

On the uplink, at the UE 120, a transmit processor 264 may receive and process data from a data source 262 and control information (e.g., for reports that include RSRP, RSSI, RSRQ, and/or CQI) from the controller/processor 280. The transmit processor 264 may generate reference symbols for one or more reference signals. The symbols from the transmit processor 264 may be precoded by a TX MIMO processor 266 if applicable, further processed by the modems 254 (e.g., for DFT-s-OFDM or CP-OFDM), and transmitted to the base station 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, and/or the TX MIMO processor 266. The transceiver may be used by a processor (e.g., the controller/processor 280) and the memory 282 to perform aspects of any of the methods described herein (e.g., with reference to FIGS. 4-8).

At the base station 110, the uplink signals from UE 120 and/or other UEs may be received by the antennas 234, processed by the modem 232 (e.g., a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The base station 110 may include a communication unit 244 and may communicate with the network controller 130 via the communication unit 244. The base station 110 may include a scheduler 246 to schedule one or more UEs 120 for downlink and/or uplink communications. In some examples, the modem 232 of the base station 110 may include a modulator and a demodulator. In some examples, the base station 110 includes a transceiver. The transceiver may include any combination of the antenna(s) 234, the modem(s) 232, the MIMO detector 236, the receive processor 238, the transmit processor 220, and/or the TX MIMO processor 230. The transceiver may be used by a processor (e.g., the controller/processor 240) and the memory 242 to perform aspects of any of the methods described herein (e.g., with reference to FIGS. 4-8).

The controller/processor 240 of the base station 110, the controller/processor 280 of the UE 120, and/or any other component(s) of FIG. 2 may perform one or more techniques associated with performing RAT searching in a dual active mode, as described in more detail elsewhere herein. For example, the controller/processor 240 of the base station 110, the controller/processor 280 of the UE 120, and/or any other component(s) of FIG. 2 may perform or direct operations of, for example, process 600 of FIG. 6, and/or other processes as described herein. The memory 242 and the memory 282 may store data and program codes for the base station 110 and the UE 120, respectively. In some examples, the memory 242 and/or the memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 600 of FIG. 6, and/or other processes as described herein. In some examples, executing instructions may include running the instructions, converting the instructions, compiling the instructions, and/or interpreting the instructions, among other examples.

In some aspects, a UE (e.g., the UE 120) may include means for detecting that a first subscription, of a plurality of subscriptions associated with the UE, is associated with an active service on a first cellular network; and/or means for searching, for a second subscription of the plurality of subscriptions, for RATs and frequency bands that are compatible with a dual active mode of the UE. The means for the UE to perform operations described herein may include, for example, one or more of communication manager 140, antenna 252, modem 254, MIMO detector 256, receive processor 258, transmit processor 264, TX MIMO processor 266, controller/processor 280, or memory 282.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above, FIG. 2 is provided as an example. Other examples may differ from what is described with regard to FIG. 2.

Figure 3:
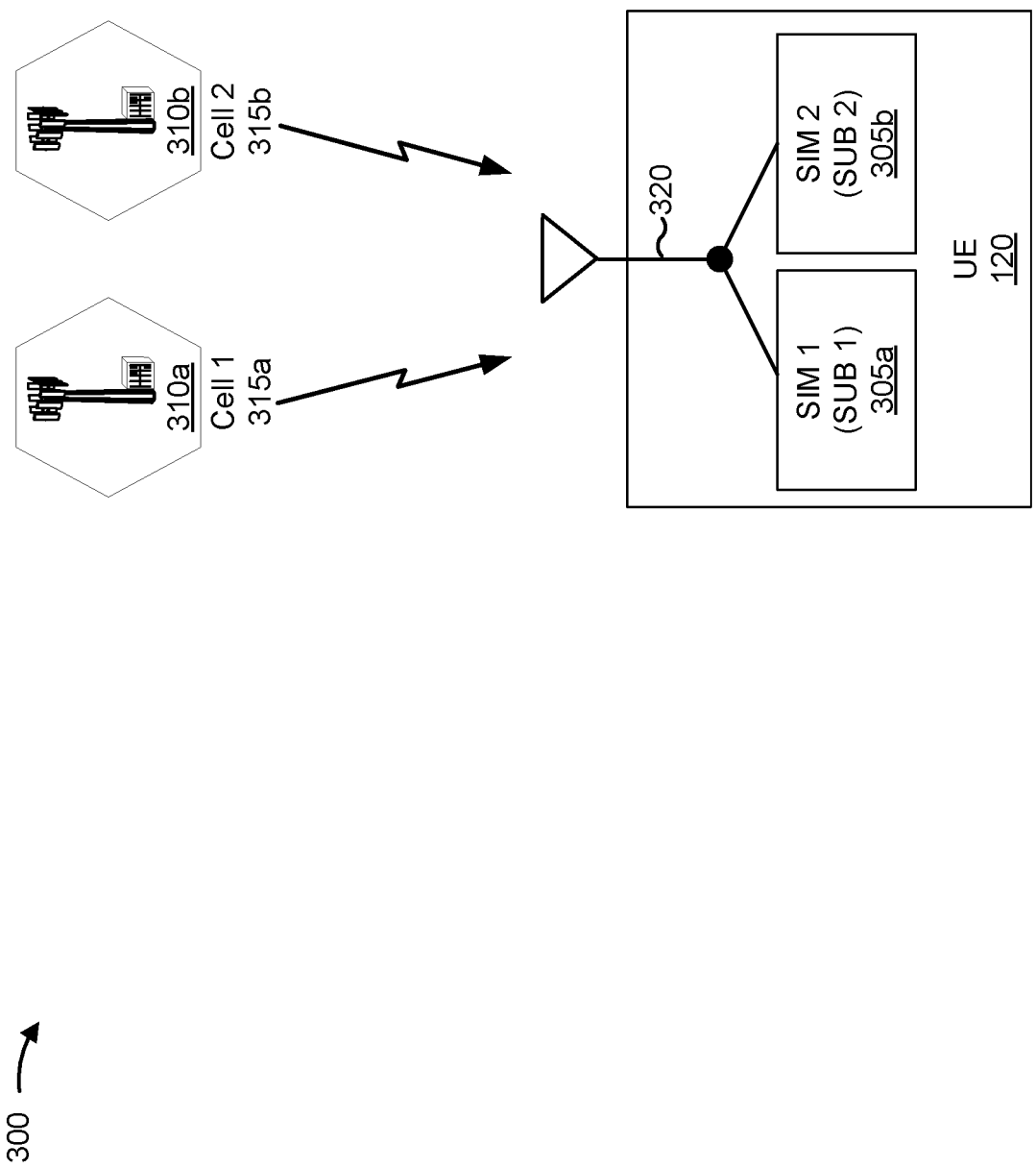
FIG. 3 is a diagram illustrating an example of a multiple subscriber identity module (SIM) UE, in accordance with the present disclosure.

FIG. 3 is a diagram illustrating an example 300 of a multi-SIM UE, in accordance with the present disclosure. As shown in FIG. 3, a UE 120 may be a multiple SIM (multi-SIM) UE that includes multiple SIMs (two or more SIMs), shown as a first SIM 305a and a second SIM 305b. The first SIM 305a may be associated with a first subscription (shown as SUB 1), and the second SIM 305b may be associated with a second subscription (shown as SUB 2). A subscription may be a subscription with a network operator (for example, an MNO) that enables the UE 120 to access a wireless network (for example, a RAN) associated with the network operator.

A SIM 305 may be a removable SIM (for example, a SIM card) or an embedded SIM. A SIM 305 may include an integrated circuit that securely stores an international mobile subscriber identity (IMSI) and a security key, which are used to identify and authenticate a corresponding subscription associated with the SIM 305. In some cases, a SIM 305 may store a list of services that the UE 120 has permission to access using a subscription associated with the SIM 305, such as a data service or a voice service, among other examples.

As further shown in FIG. 3, the UE 120 may communicate (for example, in a connected mode, an idle mode, or an inactive mode) with a first base station 310a via a first cell 315a (shown as Cell 1) using the first SIM 305a. In this case, a first subscription (SUB 1) of the UE 120 may be used to access the first cell 315a (for example, using a first IMSI for UE identification, using a first security key for UE authentication, using a first list of services that the UE 120 is permitted to access using the first subscription, or by counting data or voice usage on the first cell against the first subscription, among other examples). Similarly, the UE 120 may communicate (for example, in a connected mode, an idle mode, or an inactive mode) with a second base station 310b via a second cell 315b (shown as Cell 2) using the second SIM 305b. In this case, a second subscription (SUB 2) of the UE 120 may be used to access the second cell 315b (for example, using a second IMSI for UE identification, using a second security key for UE authentication, using a second list of services that the UE 120 is permitted to access using the second subscription, or by counting data or voice usage on the second cell against the second subscription, among other examples).

The first base station 310a and/or the second base station 310b may include one or more of the base stations 110 described above in connection with FIG. 1. Each of the first base station 310a and the second base station 310b may include an RU that exchanges wireless signals with the UE 120, connected to a corresponding DU and CU that use digital signals to instruct the RU with respect to the wireless signals transmitted to the UE and perform processing on digital signals based on the wireless signals received by the RU. Although the first cell 315a and the second cell 315b are shown as being provided by different base stations, in some aspects, the first cell 315 and the second cell 315b may be provided by the same base station. Thus, in some aspects, the first base station 310a and the second base station 310b may be integrated into a single base station.

In some cases, the UE 120 may be capable of operating in a multi-SIM multiple standby (MSMS) mode, such as a dual SIM dual standby (DSDS) mode (e.g., when the UE 120 is associated with two subscriptions). Additionally, or alternatively, the UE 120 may be capable of operating in a multi-SIM multiple active (MSMA) mode, such as a dual SIM dual active (DSDA) mode (e.g., when the UE 120 is associated with two subscriptions).

In a DSDA mode, the UE 120 is capable of concurrent active communication using both SIMs of the UE 120. Thus, a UE 120 in the DSDA mode is capable of communicating using the first SIM 305a (and the first subscription) at the same time as communicating using the second SIM 305b (and the second subscription). For example, when the UE 120 is in an active session (e.g., a voice call or another latency sensitive service, such as online gaming, stock trading, or an over-the-top (OTT) service) using the first SIM 305a, the UE 120 is capable of receiving a notification of a voice call using the second SIM 305b without interrupting communications that use the first SIM 305a, and without tuning or switching away from the first cell 315a to tune to the second cell 315b.

In a DSDS mode, the UE 120 is not capable of concurrent active communication using both SIMs of the UE 120. Thus, a UE 120 in the DSDS mode is not capable of communicating using the first SIM 305a (and the first subscription) at the same time as communicating using the second SIM 305b (and the second subscription). However, a UE 120 in the DSDS mode may be capable of switching between two separate mobile network services, may include hardware for maintaining multiple connections (for example, one connection per SIM) in a standby state, or may include hardware (for example, multiple transceivers) for maintaining multiple network connections at the same time, among other examples. However, a UE 120 in the DSDS mode may be capable of receiving data on only one connection at a time because radio frequency resources are shared between the multiple subscriptions. For example, a UE 120 in the DSDS mode may be associated with multiple subscriptions but may include only a single transceiver shared by the multiple subscriptions, a single transmit chain shared by the multiple subscriptions, or a single receive chain shared by the multiple subscriptions, among other examples.

In some examples, a UE 120 may be capable of operating in a DSDA mode for a first combination of RATs, and may not be capable of operating in a DSDA mode for a second combination of RATs. For example, the UE 120 may be capable of operating in a DSDA mode for NR+NR, where the first cell 315a (as well as the first SIM 305a and the first subscription) uses an NR RAT and the second cell 315b (as well as the second SIM 305b and the second subscription) also uses the NR RAT. However, the UE 120 may not be capable of operating in a DSDA mode for NR+LTE, where one of the first cell 315a (as well as the first SIM 305a and the first subscription) uses an NR RAT and the second cell 315b (as well as the second SIM 305b and the second subscription) uses an LTE RAT (or vice versa). In some aspects, the UE 120 may not be capable of operating in the DSDA mode for the second combination of RATs (e.g., NR+LTE), but be capable of operating in a DSDS mode for the second combination of RATs. Similarly, the UE 120 may be capable of operating in a DSDA mode for a first combination of frequency bands (e.g., operating frequency bands) and may not be capable of operating in a DSDA mode for a second combination of frequency bands. This UE design reduces design costs as compared to enabling the UE 120 to operate using the DSDA mode for the second combination of RATs. A permissible RAT combination for the DSDA mode may be referred to herein as "DSDA compatible RAT combination." Similarly, a permissible frequency band combination for the DSDA mode may be referred to herein as a "DSDA compatible frequency band combination."

In some cases, a multi-SIM UE may be capable of switching between two separate mobile network services or concurrently using two separate mobile network services, may include hardware for maintaining multiple connections (for example, one connection per SIM) in a standby state, or may include hardware (for example, multiple transceivers) for maintaining multiple network connections at the same time, among other examples. A DSDA UE may be capable of communicating on two connections at a given time, such as for multiple communications associated with different RATs or multiple communications of a single RAT. The communication on two connections may be handled by a radio frequency (RF) hardware front-end module (sometimes referred to as a radio frequency front-end (RFFE)), which is illustrated in a general sense by reference number 320. The RF hardware front-end module may include, for example, one or more power amplifiers (PAs), one or more low noise amplifiers (LNAs), one or more band filters, one or more band N-plexers, one or more band switches, and/or one or more antenna switches, among other examples.

In a multi-SIM mode such as a DSDA mode, a default data SIM (DDS) subscription may perform data activity, call activity, or the like. A non-DDS subscription may perform call-related activity, small data activity (e.g., short message service (SMS) activity or multimedia message service (MMS) activity), or similar tasks. As used herein, a "subscriber" may refer to a user, who is associated with a "subscription" that is implemented by a stack of hardware and/or software at a modem of the UE. The "subscription" may be associated with a SIM and/or another type of identifier that a network can use to provision network services to the UE implementing the subscription.

In some cases, a first service associated with a first subscription and a second service associated with a second subscription may be concurrently active (e.g., may have concurrently established communications). In such a situation, the UE may perform concurrent transmissions for two subscriptions, concurrent receptions for two subscriptions, or concurrent transmission for a first subscription and receptions for a second subscription. For example, the concurrently active services may communicate on a shared RF hardware front-end module or may share an antenna switch.

As mentioned above, a DSDA configuration allows a UE to have multiple concurrently active services associated with multiple subscribers, such as a first service associated with a DDS subscriber and a second service associated with a non-DDS subscriber. Thus, a UE may be capable of establishing calls, such as voice calls (e.g., mobile-originated (MO) calls, mobile-terminated (MT) calls, data calls, Enhanced 911 calls, gaming traffic, and/or calls associated with a threshold quality of service), and/or other services (such as gaming traffic, internet data, and/or SMS traffic) for multiple concurrently active services. A call may be associated with a RAT and/or a frequency band. For example, a call may be placed via NR (in which case the call is in accordance with NR protocol and is associated with a NR core network such as a 5G core (5GC)) or via LTE (in which case the call is in accordance with LTE protocol and is associated with an LTE core network such as an Evolved Packet System (EPS)).

In some cases, different services may be associated with different priority levels. For example, a first service may be associated with a higher priority than a second service. In some examples, each service may be associated with a priority level or priority value. For example, a configuration (such as a network configuration or an original equipment manufacturer (OEM) configuration) may indicate priority levels for different services. For example, an active voice call or video call may be associated with a first priority level, gaming traffic (e.g., on a DDS subscription) may be associated with a second priority level, an inactive or on-hold voice call or video call may be associated with a third priority level, voice signaling traffic (e.g., signaling to initiate and/or maintain a voice call) may be associated with a fourth priority level, and/or internet data traffic (and/or link list memory (LLM) gaming traffic) may be associated with a fifth priority level, among other examples. In some examples, the priority levels may indicate an order of priority (e.g., from a highest priority to a lowest priority) from the first priority level to the fifth priority level.

As described elsewhere herein, a UE may have limitations regarding combinations of services, combination of RATs, and/or combinations of frequency bands for the DSDA mode. For example, the UE may be capable of placing multiple concurrent calls via a single RAT (such as NR) as part of a DSDA configuration, but the UE may not be capable of DSDA operation while placing multiple concurrent calls via different RATs (such as a first call via LTE and a second call via NR). Additionally, or alternatively, a configuration (e.g., a network configuration or an OEM configuration) may indicate one or more permissible RAT combinations and/or frequency band combinations for the DSDA mode.

When the UE initiates an active service (e.g., a voice call or a high-priority gaming service) using a first subscription, the second subscription may enter an out-of-service (OOS) state when the second subscription is associated with a RAT and/or a frequency band that is not compatible with the DSDA mode of the UE. For example, the second subscription may be OOS when an RF hardware front-end module is unable to provide resources for the RAT and/or frequency band associated with the second subscription, concurrently with providing resources for the RAT and/or frequency band associated with the first subscription. As used herein, a RAT associated with a second subscription of the UE may be referred to as "not compatible with the DSDA mode of the UE" when the RAT does not form a DSDA compatible RAT combination with a RAT associated with a first subscription of the UE. Similarly, a frequency band associated with the second subscription of the UE may be referred to as "not compatible with the DSDA mode of the UE" when the frequency band does not form a DSDA compatible frequency band combination with a frequency band associated with the first subscription of the UE.

Additionally, or alternatively, the UE may detect radio link failure (RLF) on the second subscription when the second subscription is associated with a RAT and/or a frequency band that is not compatible with the DSDA mode of the UE. For example, the UE may detect RLF when an RF hardware front-end module is unable to perform periodic measurements using the second subscription.

Accordingly, in response to the OOS state and/or the RLF, the UE may attempt to perform cell selection and reconnection using the second subscription. However, the UE may select a RAT and/or a frequency band that is not compatible with the DSDA mode of the UE. Accordingly, the second subscription remains in the OOS state and/or RLF until the active service on the first subscription ends. This reduces throughput to the UE, and wastes battery power and processing resources on the second subscription.

In another example, the UE initiates an active service (e.g., a voice call or a high-priority gaming service) using the first subscription, and the second subscription may remain active when the second subscription is associated with a RAT and a frequency band that are compatible with the DSDA mode of the UE. However, the UE may move and/or radio conditions may change such that measurements on the RAT and the frequency band satisfy a measurement threshold associated with RLF on the second subscription. Additionally, or alternatively, the UE may no longer receive signals from the RAT within a time threshold, such that the second subscription enters an OOS state. Accordingly, the UE may attempt to perform cell selection and reconnection using the second subscription. However, the UE may select a RAT and/or a frequency band that is not compatible with the DSDA mode of the UE. Accordingly, the second subscription is stuck in the OOS state and/or RLF until the active service on the first subscription ends. This reduces throughput to the UE, and wastes battery power and processing resources on the second subscription.

Some techniques and apparatuses described herein enable a UE (e.g., UE 120) to perform cell selection in a dual active mode, such as the DSDA mode. For example, the UE 120 may detect that a first subscription (e.g., a first SIM) is associated with an active service on a first cellular network (e.g., with a first RAT and using a first frequency band). Accordingly, the UE 120 may search, for a second subscription (e.g., a second SIM), for RATs and frequency bands that are compatible with the dual active mode of the UE 120. The UE 120 may search for RATs and frequency bands that are compatible with the dual active mode of the UE 120 based at least in part on an OOS state or RLF with a second cellular network (e.g., with a second RAT and using a second frequency band) currently associated with the second subscription. The second RAT and/or the second frequency band may be not compatible with the dual active mode, which results in the OOS state or the RLF. As an alternative, the second RAT and/or the second frequency band may be compatible with the dual active mode but may lose connection during the active service, which results in the OOS state or the RLF. As a result, the UE may operate in the DSDA mode, which results in increased throughput for the UE 120 and more efficiently uses battery power and processing resources for the second subscription.

In some aspects, the UE 120 may alternate between searching, for the second subscription, for RATs and frequency bands that are compatible with the dual active mode of the UE 120, and operating in a power saving state (e.g., an idle mode, an inactive state, or another mode of operation for the second subscription that is associated with lower power, processing, and/or memory resource consumption as compared with the searching). The alternation may be based at least in part on a timer associated with the power saving state. Accordingly, the UE 120 may detect when the active service ends and may search, for the second subscription, for RATs and frequency bands that are compatible with the dual active mode of the UE 120 as well as RATs and frequency bands that are incompatible with the dual active mode, before expiry of the timer associated with the power saving state. As a result, the UE 120 resumes service on the second subscription more quickly, which reduces latency for the UE 120 and more efficiently uses battery power and processing resources for the second subscription.

As indicated above, FIG. 3 is provided as an example. Other examples may differ from what is described with regard to FIG. 3.

Figure 4:
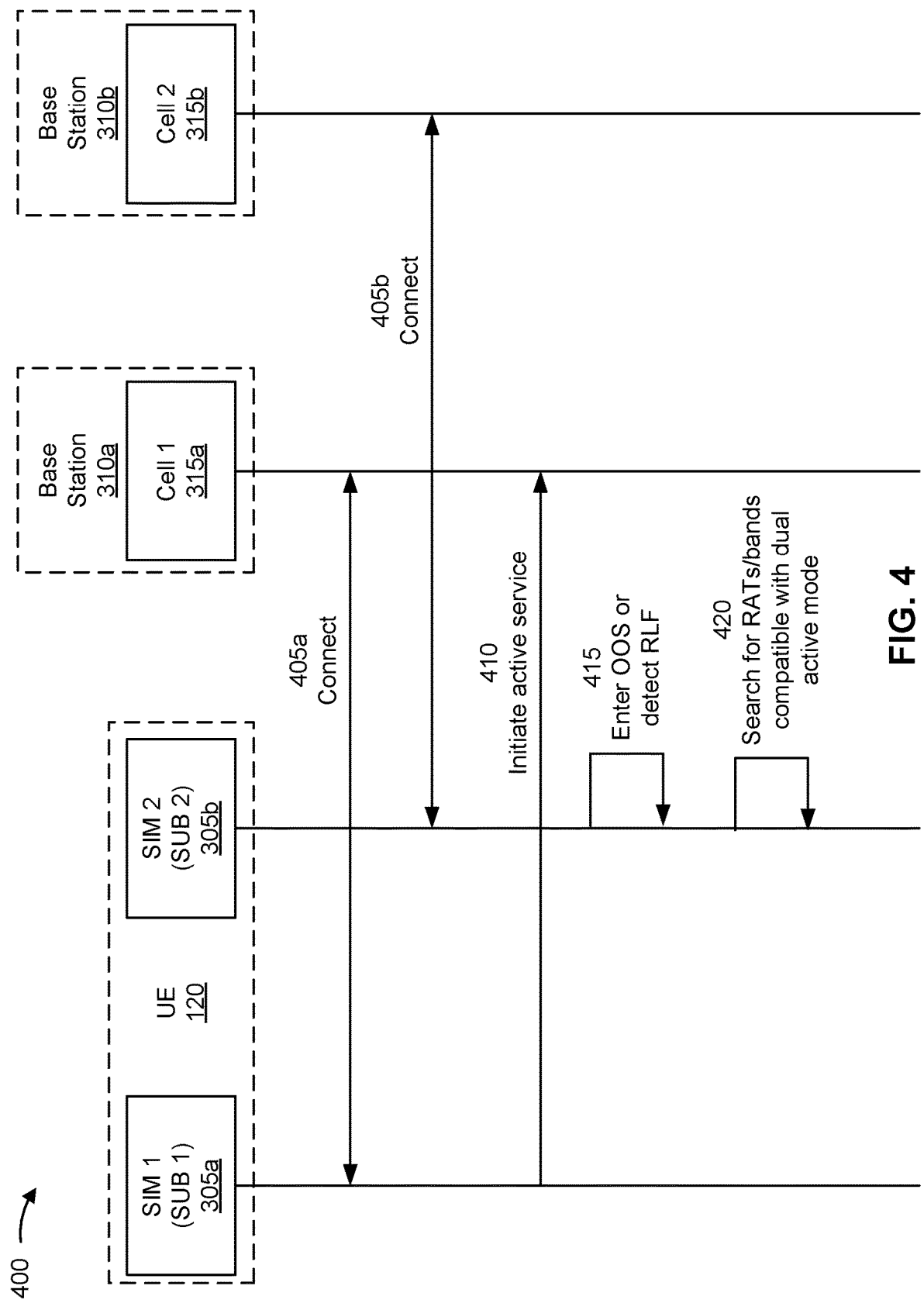
FIGS. 4 and 5 are diagrams illustrating examples associated with performing radio access technology (RAT) searching in a dual active mode, in accordance with the present disclosure.

FIG. 4 is a diagram illustrating an example 400 associated with performing cellular selection in a dual active mode, in accordance with the present disclosure. As shown in FIG. 4, a UE 120 may communicate with the first base station 310a via the first cell 315a (shown as Cell 1) using the first SIM 305a (e.g., using the first subscription). Additionally, the UE 120 may communicate with the second base station 310b via the second cell 315b (shown as Cell 2) using the second SIM 305b (e.g., using the second subscription). The UE 120 may communicate with the first base station 310a and the second base station 310b in a similar manner as described in connection with FIG. 3.

As shown by reference number 405a, the UE 120 may establish, using the first subscription (e.g., using the first SIM 305a), a first communication connection with the first base station 310a. For example, the UE 120 and the first base station 310a may perform a random access channel (RACH) procedure to establish the first communication connection.

As shown by reference number 405b, the UE 120 may establish, using the second subscription (e.g., using the second SIM 305b), a second communication connection with the second base station 310b. For example, the UE 120 and the second base station 310b may perform a RACH procedure to establish the second communication connection.

As shown by reference number 410, the UE 120 may initiate an active service on the first communication connection. For example, the active service may be associated with an active voice call, an active video call, gaming traffic, an inactive or on-hold voice call, an inactive or on-hold video call, voice signaling, and/or internet data traffic, among other examples. In some aspects, the first subscription and/or the first SIM 305a may be associated with communicating internet data traffic (e.g., the first subscription may be a DDS subscription). Alternatively, the first subscription and/or the first SIM 305a may not be associated with communicating internet data traffic (e.g., the first subscription may not be a DDS subscription (e.g., may be a non-DDS (nDDS) subscription)). The active service may be associated with a priority (e.g., a priority level or a priority value). The priority may indicate a service priority level associated with the traffic being communicated via the first subscription of the UE 120.

Accordingly, as shown by reference number 415, the UE 120 may enter an OOS state or detect RLF on the second communication connection. In some aspects, the second subscription and/or the second SIM 305b may have been associated with a second cellular network (e.g., including the second base station 310b) that is not compatible with the dual active mode of the UE 120. Accordingly, the UE 120 enters the OOS state or detects the RLF. As an alternative, the second subscription and/or the second SIM 305b may have been associated with a second cellular network (e.g., including the second base station 310b) that is compatible with the dual active mode of the UE 120; however, mobility of the UE 120 and/or changing radio conditions may have caused measurements associated with the second cellular network to satisfy a measurement threshold associated with RLF and/or caused loss of signal with the second base station 310b. Accordingly, the UE 120 enters the OOS state or detects the RLF.

As shown by reference number 420, the UE 120 may search, for the second subscription and/or the second SIM 305b, for RATs and frequency bands that are compatible with the dual active mode of the UE 120. For example, the UE 120 may exclude, from the search, RATs and frequency bands that are not compatible with the dual active mode of the UE 120.

In some aspects, the UE 120 may perform the search based at least in part on the priority, associated with the active service, satisfying a priority threshold. For example, the priority threshold may comprise a numerical threshold such that the active service satisfies the threshold when the active service is associated with a numerical indicator of priority that satisfies the threshold. Additionally, or alternatively, the priority threshold may include one or more service classes such that the active service satisfies the threshold when the active service is included in the one or more service classes. For example, the active service may satisfy the priority threshold when the active service includes at least one of a voice call or a high-priority gaming service.

Based at least in part on the search, the UE 120 may connect to a third cellular network that is compatible with the dual active mode using the second subscription and/or the second SIM 305b. For example, the UE 120 may connect to a RAT that is compatible with the dual active mode using a frequency band that is compatible with the dual active mode. Accordingly, in some aspects, the UE 120 may establish, using the second subscription (e.g., using the second SIM 305b), a third communication connection with a third base station. For example, the UE 120 and the third base station may perform a RACH procedure to establish the third communication connection.

By using techniques as described in connection with FIG. 4, the UE 120 may search, for the second subscription, for RATs and frequency bands that are compatible with the dual active mode of the UE 120. The UE 120 may search for RATs and frequency bands that are compatible with the dual active mode of the UE 120 based at least in part on an OOS state or RLF associated with the second subscription. As a result, the UE may operate in the DSDA mode, which results in increased throughput for the UE 120 and more efficiently uses battery power and processing resources for the second subscription.

As indicated above, FIG. 4 is provided as an example. Other examples may differ from what is described with respect to FIG. 4.

Figure 5:
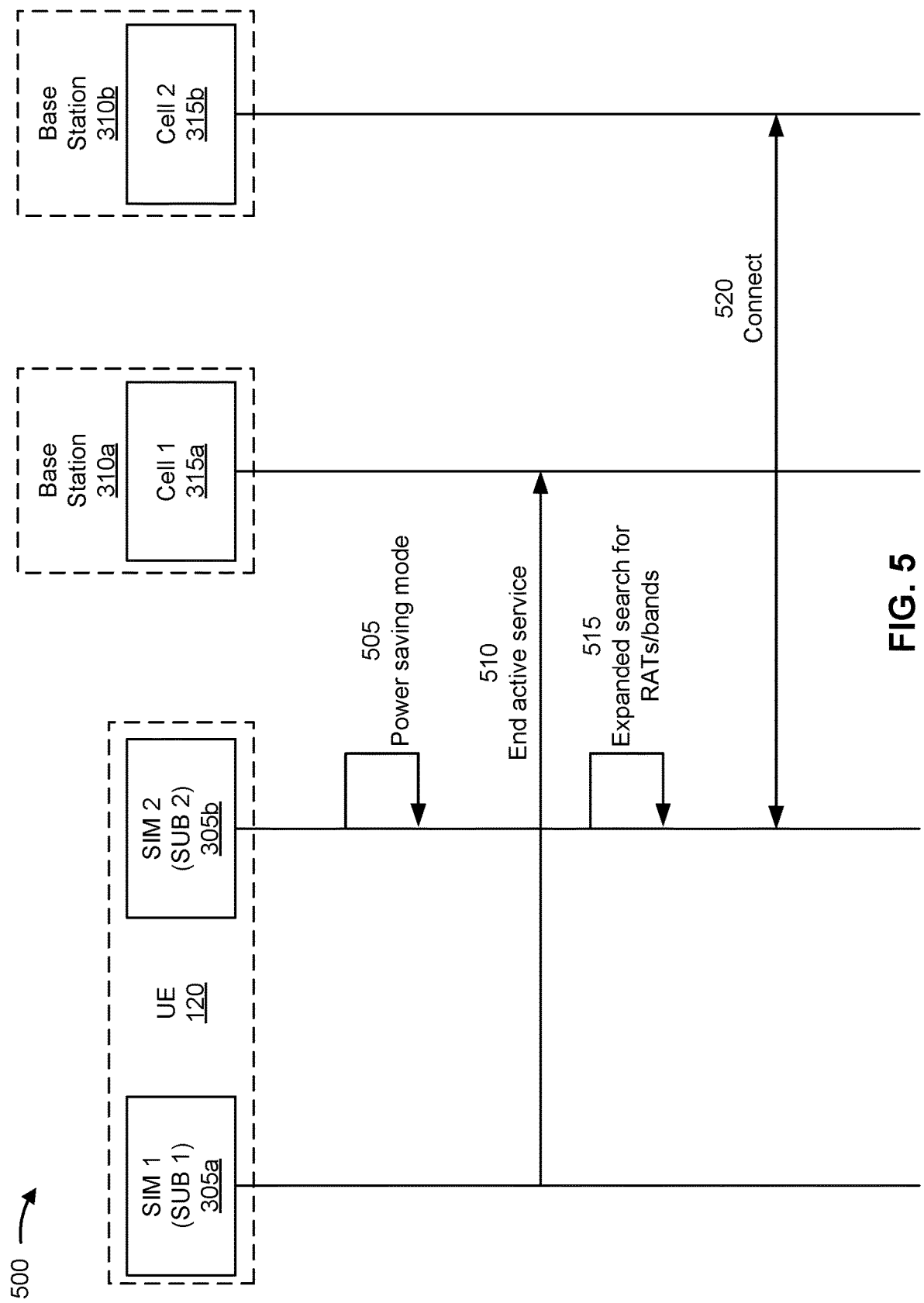

FIG. 5 is a diagram illustrating an example 500 associated with performing cellular selection in a dual active mode, in accordance with the present disclosure. As shown in FIG. 5, a UE 120 may communicate with the first base station 310a via the first cell 315a (shown as Cell 1) using the first SIM 305a (e.g., using the first subscription). Additionally, the UE 120 may communicate with the second base station 310b via the second cell 315b (shown as Cell 2) using the second SIM 305b (e.g., using the second subscription). The UE 120 may communicate with the first base station 310a and the second base station 310b in a similar manner as described in connection with FIG. 3.

As shown by reference number 505, the UE 120 may enter a power saving state using the second subscription (e.g., using the second SIM 305b) based at least in part on not finding a cellular network (e.g., not finding a RAT and/or not finding a frequency band) that is compatible with the dual active mode. For example, the UE 120 may perform one or more operations as described above in connection with FIG. 4 before entering the power saving state.

In some aspects, the power saving state may be associated with a timer. For example, after expiry of the timer, the UE 120 may search for RATs and frequency bands for the second subscription and/or the second SIM 305b. Accordingly, the UE 120 may alternate between the power saving state and searching for RATs and frequency bands for the second subscription and/or the second SIM 305b.

As shown by reference number 510, an active service associated with the first subscription (e.g., the first SIM 305a) may end. For example, the active service may include a voice call that terminates, a high-priority gaming service that ends, and/or another service that is no longer using a communication connection with the first base station 310a.

As shown by reference number 515, the UE 120 may search for RATs and frequency bands for the second subscription and/or the second SIM 305b, before expiry of the timer, based at least in part on the active service ending. In some aspects, the UE 120 may have been searching only for RATs and frequency bands that are compatible with the dual active mode of the UE 120 while the active service was ongoing. Accordingly, the UE 120 may search for RATs and frequency bands that are compatible with the dual active mode of the UE 120 as well as RATs and frequency bands that are incompatible with the dual active mode, after ending the active service. Therefore, the search after ending the active service is expanded relative to the search while the active service was ongoing.

As a result, the UE 120 reduces delay between ending the active service and resuming a connection on the second subscription and/or the second SIM 305b by searching before expiry of the timer associated with the power saving state. As shown by reference number 520, the UE 120 may connect to a third cellular network that is not compatible with the dual active mode using the second subscription and/or the second SIM 305b. For example, the UE 120 may connect to a RAT that is not compatible with the dual active mode and/or may connect using a frequency band that is not compatible with the dual active mode. Accordingly, in some aspects, the UE 120 may establish, using the second subscription (e.g., using the second SIM 305b), a third communication connection with a third base station. For example, the UE 120 and the third base station may perform a RACH procedure to establish the third communication connection.

By using techniques as described in connection with FIG. 5, the UE 120 may detect when the active service, associated with the first subscription, ends and may search, for the second subscription, for RATs and frequency bands that are compatible with the dual active mode of the UE 120 as well as RATs and frequency bands that are incompatible with the dual active mode, before expiry of the timer associated with the power saving state. As a result, the UE 120 resumes service on the second subscription more quickly, which reduces latency for the UE 120 and more efficiently uses battery power and processing resources for the second subscription.

As indicated above, FIG. 5 is provided as an example. Other examples may differ from what is described with respect to FIG. 5.

Figure 6:
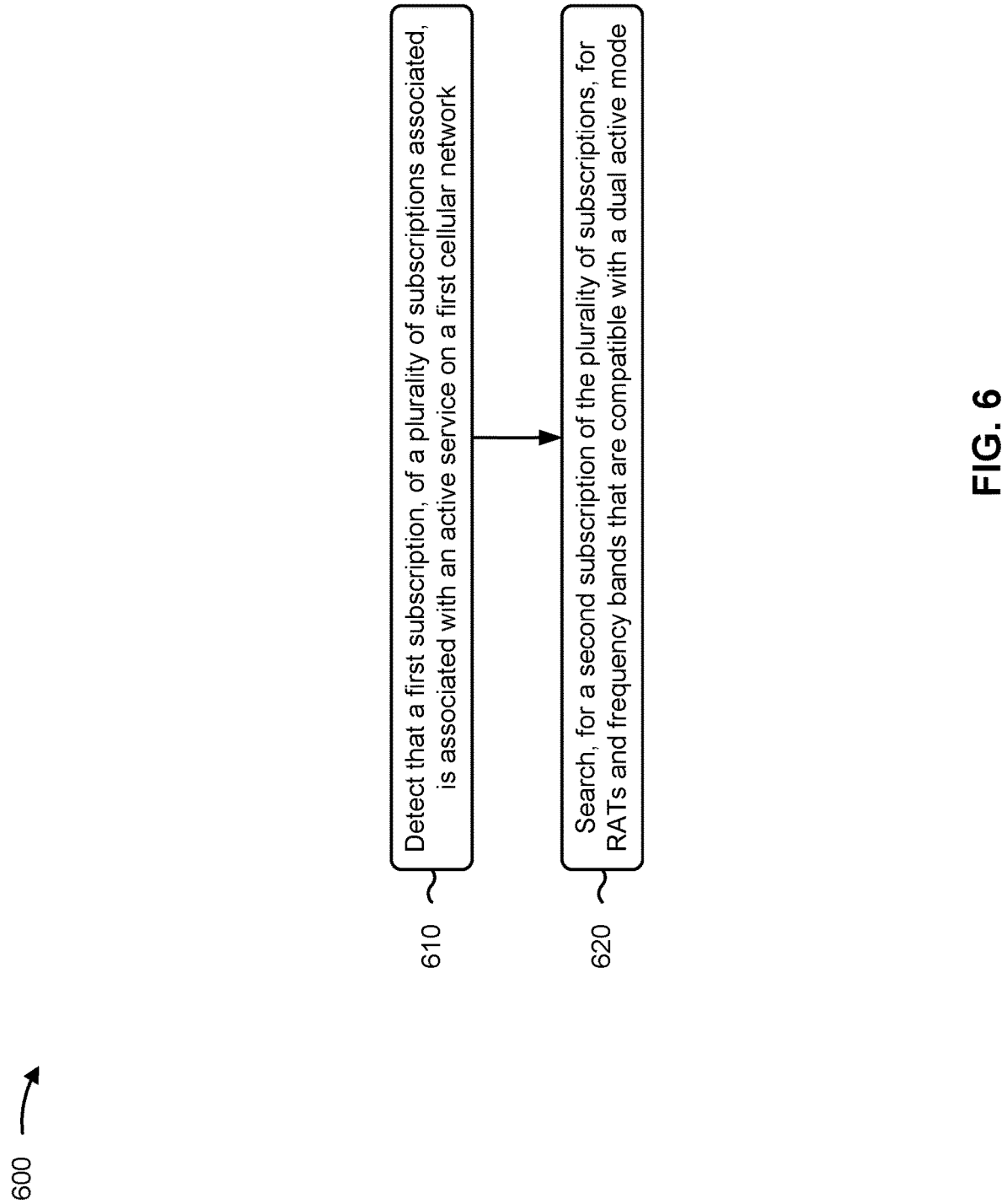
FIG. 6 is a diagram illustrating an example process associated with performing RAT searching in a dual active mode, in accordance with the present disclosure.

FIG. 6 is a diagram illustrating an example process 600 performed, for example, by a UE, in accordance with the present disclosure. Example process 600 is an example where the UE (e.g., UE 120 and/or apparatus 700 of FIG. 7) performs operations associated with RAT searching in a dual active mode.

As shown in FIG. 6, in some aspects, process 600 may include detecting that a first subscription, of a plurality of subscriptions associated with the UE, is associated with an active service on a first cellular network (block 610). For example, the UE (e.g., using communication manager 140 and/or detection component 708, depicted in FIG. 7) may detect that a first subscription, of a plurality of subscriptions associated with the UE, is associated with an active service on a first cellular network, as described herein.

As further shown in FIG. 6, in some aspects, process 600 may include searching, for a second subscription of the plurality of subscriptions, for RATs and frequency bands that are compatible with a dual active mode of the UE (block 620). For example, the UE (e.g., using communication manager 140 and/or searching component 710, depicted in FIG. 7) may search, for a second subscription of the plurality of subscriptions, for RATs and frequency bands that are compatible with a dual active mode of the UE, as described herein.

Process 600 may include additional aspects, such as any single aspect or any combination of aspects described below and/or in connection with one or more other processes described elsewhere herein.

In a first aspect, the first subscription is associated with a first SIM, and the second subscription is associated with a second SIM.

In a second aspect, alone or in combination with the first aspect, the dual active mode comprises a DSDA mode.

In a third aspect, alone or in combination with one or more of the first and second aspects, the active service is associated with a priority that satisfies a priority threshold.

Figure 7:
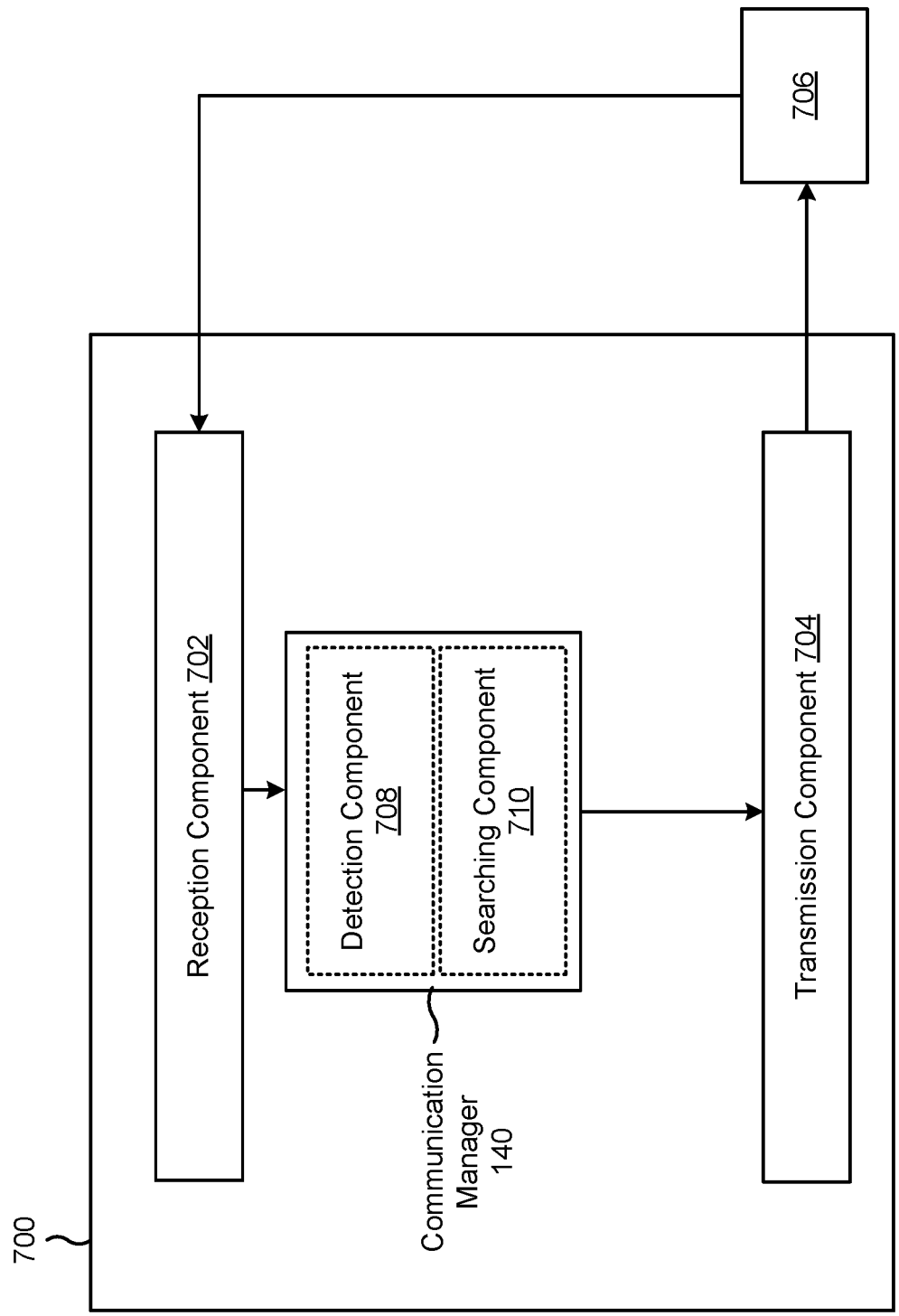
FIGS. 7 and 8 are diagrams of example apparatuses for wireless communication, in accordance with the present disclosure.

In a fourth aspect, alone or in combination with one or more of the first through third aspects, the second subscription is currently associated with a service on a second cellular network that is not compatible with the dual active mode, and process 600 further includes entering an OOS state with the second cellular network (e.g., using communication manager 140, reception component 702, and/or transmission component 704, depicted in FIG. 7) or detecting RLF with the second cellular network (e.g., using communication manager 140 and/or detection component 708), such that searching for RATs and frequency bands that are compatible with the dual active mode is based at least in part on the OOS state or the RLF.

In a fifth aspect, alone or in combination with one or more of the first through fourth aspects, process 600 further includes connecting to a third cellular network (e.g., using communication manager 140, reception component 702, and/or transmission component 704) that is compatible with the dual active mode using the second subscription.

In a sixth aspect, alone or in combination with one or more of the first through fifth aspects, process 600 further includes entering a power saving state (e.g., using communication manager 140, reception component 702, and/or transmission component 704) using the second subscription based at least in part on not finding a cellular network that is compatible with the dual active mode.

In a seventh aspect, alone or in combination with one or more of the first through sixth aspects, process 600 further includes detecting that the active service on the first cellular network has ended (e.g., using communication manager 140 and/or detection component 708), and searching (e.g., using communication manager 140 and/or searching component 710), for the second subscription, for RATs and frequency bands that are compatible with the dual active mode of the UE and for RATs and frequency bands that are incompatible with the dual active mode, before expiry of a timer associated with the power saving state.

In an eighth aspect, alone or in combination with one or more of the first through seventh aspects, the second subscription is currently associated with a service on a second cellular network that is compatible with the dual active mode, and process 600 further includes entering an OOS state with the second cellular network (e.g., using communication manager 140, reception component 702, and/or transmission component 704) or detecting RLF with the second cellular network (e.g., using communication manager 140 and/or detection component 708), such that searching for RATs and frequency bands that are compatible with the dual active mode is based at least in part on the OOS state or the RLF.

In a ninth aspect, alone or in combination with one or more of the first through eighth aspects, the active service includes at least one of a voice call or a high-priority gaming service.

Although FIG. 6 shows example blocks of process 600, in some aspects, process 600 may include additional blocks, fewer blocks, different blocks, or differently arranged blocks than those depicted in FIG. 6. Additionally, or alternatively, two or more of the blocks of process 600 may be performed in parallel.

FIG. 7 is a diagram of an example apparatus 700 for wireless communication. The apparatus 700 may be a UE, or a UE may include the apparatus 700. In some aspects, the apparatus 700 includes a reception component 702 and a transmission component 704, which may be in communication with one another (for example, via one or more buses and/or one or more other components). As shown, the apparatus 700 may communicate with another apparatus 706 (such as a UE, a base station, or another wireless communication device) using the reception component 702 and the transmission component 704. As further shown, the apparatus 700 may include the communication manager 140. The communication manager 140 may include one or more of a detection component 708 and/or a searching component 710, among other examples.

In some aspects, the apparatus 700 may be configured to perform one or more operations described herein in connection with FIGS. 4-5. Additionally, or alternatively, the apparatus 700 may be configured to perform one or more processes described herein, such as process 600 of FIG. 6, or a combination thereof. In some aspects, the apparatus 700 and/or one or more components shown in FIG. 7 may include one or more components of the UE described in connection with FIG. 2. Additionally, or alternatively, one or more components shown in FIG. 7 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 702 may receive communications, such as reference signals, control information, data communications, or a combination thereof, from the apparatus 706. The reception component 702 may provide received communications to one or more other components of the apparatus 700. In some aspects, the reception component 702 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 700. In some aspects, the reception component 702 may include one or more antennas, a modem, a demodulator, a MIMO detector, a receive processor, a controller/processor, a memory, or a combination thereof, of the UE described in connection with FIG. 2.

The transmission component 704 may transmit communications, such as reference signals, control information, data communications, or a combination thereof, to the apparatus 706. In some aspects, one or more other components of the apparatus 700 may generate communications and may provide the generated communications to the transmission component 704 for transmission to the apparatus 706. In some aspects, the transmission component 704 may perform signal processing on the generated communications (such as filtering, amplification, modulation, digital-to-analog conversion, multiplexing, interleaving, mapping, or encoding, among other examples), and may transmit the processed signals to the apparatus 706. In some aspects, the transmission component 704 may include one or more antennas, a modem, a modulator, a transmit MIMO processor, a transmit processor, a controller/processor, a memory, or a combination thereof, of the UE described in connection with FIG. 2. In some aspects, the transmission component 704 may be co-located with the reception component 702 in a transceiver.

In some aspects, the detection component 708 may detect that a first subscription, of a plurality of subscriptions associated with the apparatus 700, is associated with an active service on a first cellular network. The detection component 708 may include a modem, a MIMO detector, a receive processor, a transmit MIMO processor, a transmit processor, a controller/processor, a memory, or a combination thereof, of the UE described in connection with FIG. 2. Accordingly, the searching component 710 may search, for a second subscription of the plurality of subscriptions, for RATs and frequency bands that are compatible with a dual active mode of the apparatus 700. The searching component 710 may include one or more antennas, a modem, a demodulator, a MIMO detector, a receive processor, a controller/processor, a memory, or a combination thereof, of the UE described in connection with FIG. 2.

In some aspects, the reception component 702 and/or the transmission component 704 may connect to a third cellular network that is compatible with the dual active mode using the second subscription. As an alternative, the reception component 702 and/or the transmission component 704 may enter a power saving state using the second subscription based at least in part on not finding a cellular network that is compatible with the dual active mode.

In some aspects, the detection component 708 may detect that the active service on the first cellular network has ended. Accordingly, the searching component 710 may search, for the second subscription, for RATs and frequency bands that are compatible with the dual active mode of the apparatus 700 and for RATs and frequency bands that are incompatible with the dual active mode, before expiry of a timer associated with the power saving state.

The number and arrangement of components shown in FIG. 7 are provided as an example. In practice, there may be additional components, fewer components, different components, or differently arranged components than those shown in FIG. 7. Furthermore, two or more components shown in FIG. 7 may be implemented within a single component, or a single component shown in FIG. 7 may be implemented as multiple, distributed components. Additionally, or alternatively, a set of (one or more) components shown in FIG. 7 may perform one or more functions described as being performed by another set of components shown in FIG. 7.

Figure 8:
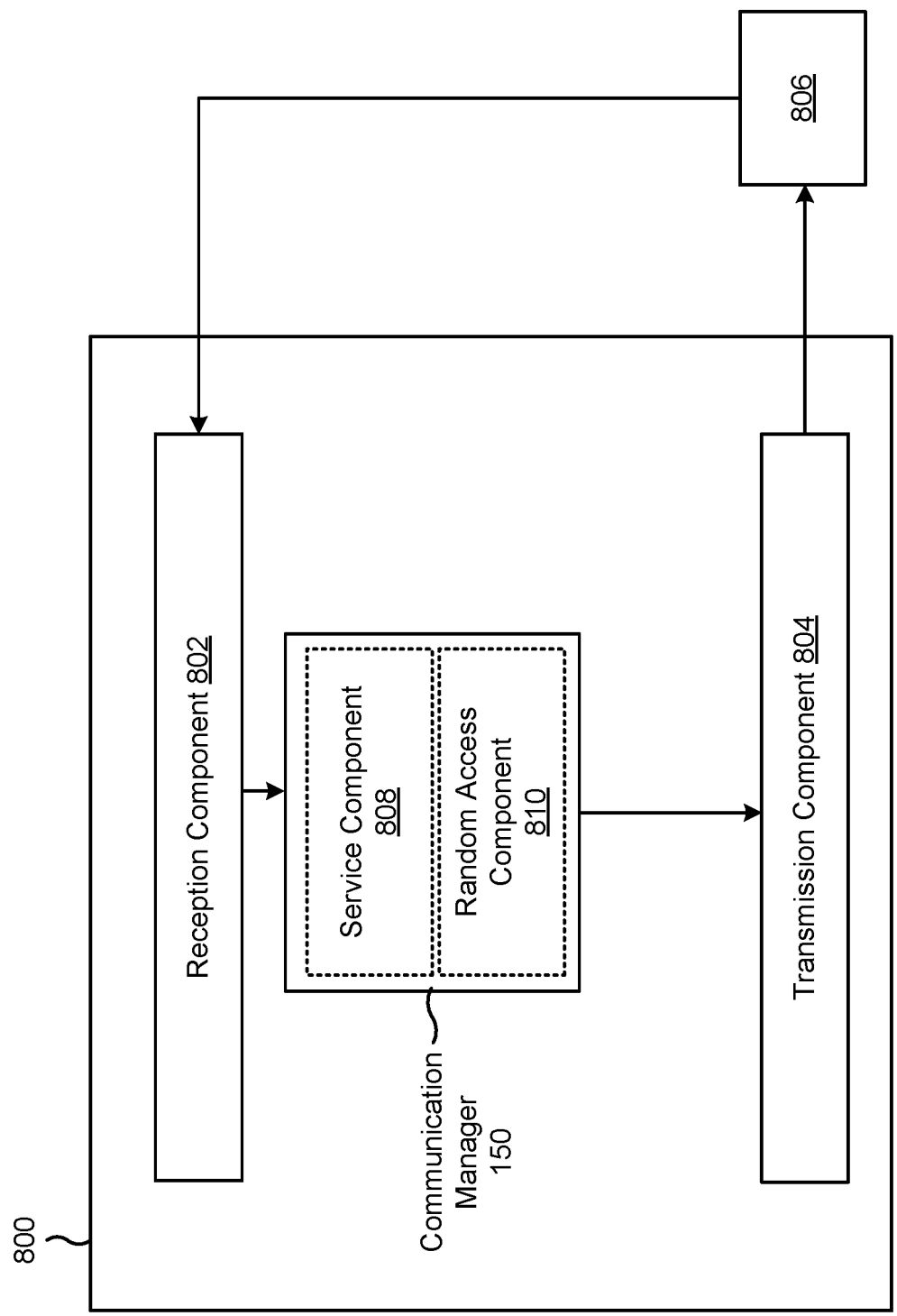

FIG. 8 is a diagram of an example apparatus 800 for wireless communication. The apparatus 800 may be a RAN node (e.g., a CU, a DU, and/or an RU), or a RAN node may include the apparatus 800. In some aspects, the apparatus 800 includes a reception component 802 and a transmission component 804, which may be in communication with one another (for example, via one or more buses and/or one or more other components). As shown, the apparatus 800 may communicate with another apparatus 806 (such as a UE, a base station, or another wireless communication device) using the reception component 802 and the transmission component 804. As further shown, the apparatus 800 may include the communication manager 150. The communication manager 150 may include one or more of a service component 808 and/or a random access component 810, among other examples.

In some aspects, the apparatus 800 may be configured to perform one or more operations described herein in connection with FIGS. 4-5. Additionally, or alternatively, the apparatus 800 may be configured to perform one or more processes described herein, or a combination thereof. In some aspects, the apparatus 800 and/or one or more components shown in FIG. 8 may include one or more components of the base station described in connection with FIG. 2. Additionally, or alternatively, one or more components shown in FIG. 8 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 802 may receive communications, such as reference signals, control information, data communications, or a combination thereof, from the apparatus 806. The reception component 802 may provide received communications to one or more other components of the apparatus 800. In some aspects, the reception component 802 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 800. In some aspects, the reception component 802 may include one or more antennas, a modem, a demodulator, a MIMO detector, a receive processor, a controller/processor, a memory, or a combination thereof, of the base station described in connection with FIG. 2.

The transmission component 804 may transmit communications, such as reference signals, control information, data communications, or a combination thereof, to the apparatus 806. In some aspects, one or more other components of the apparatus 800 may generate communications and may provide the generated communications to the transmission component 804 for transmission to the apparatus 806. In some aspects, the transmission component 804 may perform signal processing on the generated communications (such as filtering, amplification, modulation, digital-to-analog conversion, multiplexing, interleaving, mapping, or encoding, among other examples), and may transmit the processed signals to the apparatus 806. In some aspects, the transmission component 804 may include one or more antennas, a modem, a modulator, a transmit MIMO processor, a transmit processor, a controller/processor, a memory, or a combination thereof, of the base station described in connection with FIG. 2. In some aspects, the transmission component 804 may be co-located with the reception component 802 in a transceiver.

In some aspects, the service component 808 may provision an active service for a first subscription of the apparatus 806. When the apparatus 800 (and a corresponding frequency band) are compatible with a dual active mode of the apparatus 806, the apparatus 806 may search, for a second subscription of the apparatus 806, for RATs and frequency bands compatible with the dual active mode.

As an alternative, the random access component 810 may process a connection request from the apparatus 806. For example, when the apparatus 800 and a corresponding frequency band are compatible with a dual active mode of the apparatus 806, the apparatus 806 may request a connection with the apparatus 800 for a second subscription while an active service associated with a first subscription of the apparatus 806 is ongoing.

The number and arrangement of components shown in FIG. 8 are provided as an example. In practice, there may be additional components, fewer components, different components, or differently arranged components than those shown in FIG. 8. Furthermore, two or more components shown in FIG. 8 may be implemented within a single component, or a single component shown in FIG. 8 may be implemented as multiple, distributed components. Additionally, or alternatively, a set of (one or more) components shown in FIG. 8 may perform one or more functions described as being performed by another set of components shown in FIG. 8.

The following provides an overview of some Aspects of the present disclosure:

Aspect 1: A method of wireless communication performed by a user equipment (UE), comprising: detecting that a first subscription, of a plurality of subscriptions associated with the UE, is associated with an active service on a first cellular network; and searching, for a second subscription of the plurality of subscriptions, for radio access technologies (RATs) and frequency bands that are compatible with a dual active mode of the UE.

Aspect 2: The method of Aspect 1, wherein the first subscription is associated with a first subscriber identity module (SIM), and the second subscription is associated with a second SIM.

Aspect 3: The method of Aspect 2, wherein the dual active mode comprises a dual SIM dual active (DSDA) mode.

Aspect 4: The method of any of Aspects 1 through 3, wherein the active service is associated with a priority that satisfies a priority threshold.

Aspect 5: The method of any of Aspects 1 through 4, wherein the second subscription is currently associated with a service on a second cellular network that is not compatible with the dual active mode, and wherein the method further comprises: entering an out-of-service (OOS) state with the second cellular network or detecting radio link failure (RLF) with the second cellular network, wherein the searching for RATs and frequency bands that are compatible with the dual active mode is based at least in part on the OOS state or the RLF.

Aspect 6: The method of Aspect 5, further comprising: connecting to a third cellular network that is compatible with the dual active mode using the second subscription.

Aspect 7: The method of Aspect 5, further comprising: entering a power saving state using the second subscription based at least in part on not finding a cellular network that is compatible with the dual active mode.

Aspect 8: The method of Aspect 7, further comprising: detecting that the active service on the first cellular network has ended; and searching, for the second subscription, for RATs and frequency bands that are compatible with the dual active mode of the UE and for RATs and frequency bands that are incompatible with the dual active mode, before expiry of a timer associated with the power saving state.

Aspect 9: The method of any of Aspects 1 through 4, wherein the second subscription is currently associated with a service on a second cellular network that is compatible with the dual active mode, and wherein the method further comprises: entering an out-of-service (OOS) state with the second cellular network or detecting radio link failure (RLF) with the second cellular network, wherein the searching for RATs and frequency bands that are compatible with the dual active mode is based at least in part on the OOS state or the RLF.

Aspect 10: The method of any of Aspects 1 through 9, wherein the active service includes at least one of a voice call or a high-priority gaming service.

Aspect 11: An apparatus for wireless communication at a device, comprising a processor; memory coupled with the processor; and instructions stored in the memory and executable by the processor to cause the apparatus to perform the method of one or more of Aspects 1-10.

Aspect 12: A device for wireless communication, comprising a memory and one or more processors coupled to the memory, the one or more processors configured to perform the method of one or more of Aspects 1-10.

Aspect 13: An apparatus for wireless communication, comprising at least one means for performing the method of one or more of Aspects 1-10.

Aspect 15: A non-transitory computer-readable medium storing code for wireless communication, the code comprising instructions executable by a processor to perform the method of one or more of Aspects 1-10.

Aspect 15: A non-transitory computer-readable medium storing a set of instructions for wireless communication, the set of instructions comprising one or more instructions that, when executed by one or more processors of a device, cause the device to perform the method of one or more of Aspects 1-10.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. An apparatus for wireless communication at a user equipment (UE), comprising:
   a memory; and
   one or more processors, coupled with the memory, configured to:
   detect that a first subscription, of a plurality of subscriptions associated with the UE, is associated with an active service on a first cellular network; and
   search, for a second subscription of the plurality of subscriptions, for radio access technologies (RATs) and frequency bands that are compatible with a dual active mode of the UE;
   wherein the second subscription is currently associated with a service on a second cellular network that is not compatible with the dual active mode, and wherein the one or more processors are further configured to: enter an out-of-service (OOS) state with the second cellular network or detect radio link failure (RLF) with the second cellular network, wherein the one or more processors search for RATs and frequency bands that are compatible with the dual active mode based at least in part on the OOS state or the RLF.

2. The apparatus of claim 1, wherein the first subscription is associated with a first subscriber identity module (SIM), and the second subscription is associated with a second SIM.

3. The apparatus of claim 2, wherein the dual active mode comprises a dual SIM dual active (DSDA) mode.

4. The apparatus of claim 1, wherein the active service is associated with a priority that satisfies a priority threshold.

5. The apparatus of claim 1, wherein the one or more processors are further configured to:
   connect to a third cellular network that is compatible with the dual active mode using the second subscription.

6. The apparatus of claim 1, wherein the one or more processors are further configured to:
   enter a power saving state using the second subscription based at least in part on not finding a cellular network that is compatible with the dual active mode.

7. The apparatus of claim 6, wherein the one or more processors are further configured to:
   detect that the active service on the first cellular network has ended; and
   search, for the second subscription, for RATs and frequency bands that are compatible with the dual active mode of the UE and for RATs and frequency bands that are incompatible with the dual active mode, before expiry of a timer associated with the power saving state.

8. The apparatus of claim 1, wherein the second subscription is currently associated with a service on a second cellular network that is compatible with the dual active mode, and wherein the one or more processors are further configured to:
   enter an out-of-service (OOS) state with the second cellular network or detect radio link failure (RLF) with the second cellular network,
   wherein the one or more processors search for RATs and frequency bands that are compatible with the dual active mode based at least in part on the OOS state or the RLF.

9. The apparatus of claim 1, wherein the active service includes at least one of a voice call or a high-priority gaming service.

10. A method of wireless communication performed by a user equipment (UE), comprising:
    detecting that a first subscription, of a plurality of subscriptions associated with the UE, is associated with an active service on a first cellular network; and
    searching, for a second subscription of the plurality of subscriptions, for radio access technologies (RATs) and frequency bands that are compatible with a dual active mode of the UE; wherein the second subscription is currently associated with a service on a second cellular network that is not compatible with the dual active mode, and wherein the method further comprises entering an out-of-service (OOS) state with the second cellular network or detecting radio link failure (RLF) with the second cellular network, wherein the searching for RATs and frequency bands that are compatible with the dual active mode is based at least in part on the OOS state or the RLF.

11. The method of claim 10, wherein the first subscription is associated with a first subscriber identity module (SIM), and the second subscription is associated with a second SIM.

12. The method of claim 11, wherein the dual active mode comprises a dual SIM dual active (DSDA) mode.

13. The method of claim 10, wherein the active service is associated with a priority that satisfies a priority threshold.

14. The method of claim 10, further comprising:
    connecting to a third cellular network that is compatible with the dual active mode using the second subscription.

15. The method of claim 10, further comprising:
    entering a power saving state using the second subscription based at least in part on not finding a cellular network that is compatible with the dual active mode.

16. The method of claim 15, further comprising:
    detecting that the active service on the first cellular network has ended; and searching, for the second subscription, for RATs and frequency bands that are compatible with the dual active mode of the UE and for RATs and frequency bands that are incompatible with the dual active mode, before expiry of a timer associated with the power saving state.

17. The method of any of claim 10, wherein the second subscription is currently associated with a service on a second cellular network that is compatible with the dual active mode, and wherein the method further comprises:
entering an out-of-service (OOS) state with the second cellular network or detecting radio link failure (RLF) with the second cellular network,
wherein the searching for RATs and frequency bands that are compatible with the dual active mode is based at least in part on the OOS state or the RLF.

18. The method of claim 10, wherein the active service includes at least one of a voice call or a high-priority gaming service.

19. A non-transitory computer-readable medium storing a set of instructions for wireless communication, the set of instructions comprising:
one or more instructions that, when executed by one or more processors of a user equipment (UE), cause the UE to:
detect that a first subscription, of a plurality of subscriptions associated with the UE, is associated with an active service on a first cellular network;
search, for a second subscription of the plurality of subscriptions, for radio access technologies (RATs) and frequency bands that are compatible with a dual active mode of the UE; and
enter an out-of-service (OOS) state with the second cellular network or detect radio link failure (RLF) with the second cellular network, wherein the one or more instructions cause the UE to search for RATs and frequency bands that are compatible with the dual active mode based at least in part on the OOS state or the RLF.

20. The non-transitory computer-readable medium of claim 19, wherein the first subscription is associated with a first subscriber identity module (SIM), and the second subscription is associated with a second SIM.

21. The non-transitory computer-readable medium of claim 20, wherein the dual active mode comprises a dual SIM dual active (DSDA) mode.

22. The non-transitory computer-readable medium of claim 19, wherein the active service is associated with a priority that satisfies a priority threshold.

23. The non-transitory computer-readable medium of claim 19, wherein the one or more instructions further cause the UE to:
connect to a third cellular network that is compatible with the dual active mode using the second subscription.

24. The non-transitory computer-readable medium of claim 19, wherein the one or more instructions further cause the UE to:
enter a power saving state using the second subscription based at least in part on not finding a cellular network that is compatible with the dual active mode.

25. The non-transitory computer-readable medium of claim 24, wherein the one or more instructions further cause the UE to:
detect that the active service on the first cellular network has ended; and
search, for the second subscription, for RATs and frequency bands that are compatible with the dual active mode of the UE and for RATs and frequency bands that are incompatible with the dual active mode, before expiry of a timer associated with the power saving state.

26. The non-transitory computer-readable medium of claim 19, wherein the second subscription is currently associated with a service on a second cellular network that is compatible with the dual active mode, and wherein the one or more instructions further cause the UE to:
enter an out-of-service (OOS) state with the second cellular network or detect radio link failure (RLF) with the second cellular network,
wherein the one or more instructions cause the UE to search for RATs and frequency bands that are compatible with the dual active mode based at least in part on the OOS state or the RLF.

* * * * *